US009514540B2

(12) United States Patent
Wang et al.

(10) Patent No.: US 9,514,540 B2
(45) Date of Patent: Dec. 6, 2016

(54) METHOD AND APPARATUS FOR PROCESSING A VIDEO FRAME IN A VIDEO FILE

(71) Applicant: Nokia Technologies Oy, Espoo (FI)

(72) Inventors: Kong Qiao Wang, Beijing (CN); Jiangwei Li, Beijing (CN); He Yan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/720,074

(22) Filed: May 22, 2015

(65) Prior Publication Data

US 2015/0348276 A1 Dec. 3, 2015

(30) Foreign Application Priority Data

May 27, 2014 (CN) .......................... 2014 1 0226947

(51) Int. Cl.
*G06K 9/36* (2006.01)
*G06T 7/00* (2006.01)
(Continued)

(52) U.S. Cl.
CPC ............... *G06T 7/0087* (2013.01); *G06K 9/38* (2013.01); *G06K 9/42* (2013.01); *G06K 9/6218* (2013.01);
(Continued)

(58) Field of Classification Search
USPC ........ 382/236, 173, 233, 250, 159, 103; 1/1; 386/280
See application file for complete search history.

(56) References Cited

U.S. PATENT DOCUMENTS 6,999,620 B1 * 2/2006 Harville ............. G06K 9/00624
382/103
9,031,343 B2 * 5/2015 Venkataraman .......... G06T 9/00
382/250

(Continued)

OTHER PUBLICATIONS

Yang et al., "Spatio-Temporal LBP based Moving Object Segmentation in Compressed Domain", IEEE Ninth International Conference on Advanced Video and Signal-Based Surveillance, Sep. 18-21, 2012, pp. 252-257.

(Continued)

*Primary Examiner* — Anh Do
(74) *Attorney, Agent, or Firm* — Alston & Bird LLP

(57) ABSTRACT

The present invention provides a method and apparatus for processing a video frame in a video file, the method comprising: for each predetermined numerical value of one or more predetermined numerical values, comparing the video frame with a video frame spaced prior to the video frame by the predetermined numerical value of frames to obtain a first inter-frame difference; comparing the video frame with a video frame spaced after the video frame by the predetermined numerical value of frames to obtain a second inter-frame difference; and for each pixel of the video frame, obtaining a confidence map associating the video frame by the predetermined numerical value based on a smaller value of the first inter-frame difference and the second inter-frame difference; and determining, at least based on a value of each pixel in one or more of the confidence maps associated with a corresponding predetermined numerical value, whether the pixel belongs to a foreground.

20 Claims, 11 Drawing Sheets

(51) Int. Cl.
| | |
|---|---|
| G06T 11/60 | (2006.01) |
| G06K 9/42 | (2006.01) |
| G06K 9/38 | (2006.01) |
| H04N 5/272 | (2006.01) |
| H04N 5/14 | (2006.01) |
| G06K 9/62 | (2006.01) |

(52) U.S. Cl.
CPC ........... *G06T 7/0081* (2013.01); *G06T 7/0097* (2013.01); *G06T 11/60* (2013.01); *H04N 5/145* (2013.01); *H04N 5/272* (2013.01); *G06T 2207/10016* (2013.01); *G06T 2207/20076* (2013.01); *G06T 2207/20141* (2013.01); *G06T 2207/20144* (2013.01); *G06T 2207/20148* (2013.01)

(56) References Cited

U.S. PATENT DOCUMENTS

| | | | |
|---|---|---|---|
| 9,042,667 B2* | 5/2015 | Venkataraman | .......... G06T 9/00 382/233 |
| 2013/0176430 A1 | 7/2013 | Zhu et al. | |

OTHER PUBLICATIONS

Ding et al., "Robust Moving Object Segmentation With Two-Stage Optimization", First Asian Conference on Pattern Recognition, Nov. 28, 2011, pp. 149-153.

Kim et al., "A Fast and Robust moving object segmentation in video sequences", International Conference on Image Processing, vol. 2, Oct. 24-28, 1999, pp. 131-134.

Christodoulou et al., "Advanced Statistical and Adaptive Threshold Techniques for Moving Object Detection and Segmentation", 17th International Conference on Digital Signal Processing, Jul. 6-8, 2011, 6 pages.

Yoon et al., "Moving Object Segmentation Based on Human Visual Sensitivity", Lecture Notes in Computer Science Biologically Motivated Computer Vision, vol. 1811, Feb. 1, 2000, pp. 62-72.

Spagnolo et al., "Moving Object Segmentation by Background Subtraction and Temporal Analysis", Image and Vision Computing, vol. 24, No. 5, May 2006, pp. 411-423.

Azab et al., "A New Technique for Background Modeling and Subtraction for Motion Detection in Real-Time Videos", IEEE International Conference on Image Processing, Sep. 26-29, 2010, pp. 3453-3456.

Ellis et al., "Online Learning for Fast Segmentation of Moving Objects Related Work", Lecture Notes in Computer Science Computer Vision, vol. 7725, 2012, pp. 1-14.

Huang et al., "Robust Object Segmentation Using Adaptive Thresholding", IEEE International Conference on Image Processing, vol. 1, Sep. 16-Oct. 19, 2007, 28 Pages.

Rambabu et al., "Robust and Accurate Segmentation of Moving Objects in Real-Time Video", The 4th international symposium on ubiquitous VR, 2006, pp. 75-78.

Stalder et al., "Cascaded Confidence Filtering for Improved Tracking-By-Detection", Proceedings of the 11th European conference on Computer vision: Part I, 2010, pp. 1-14.

Extended European Search Report received for corresponding European Patent Application No. 15169145.8, dated Nov. 6, 2015, 10 pages.

Alex et al., "BSFD: Background Subtraction Frame Difference Algorithm for Moving Object Detection and Extraction", Journal of Theoretical and Applied Information Technology, vol. 60, No. 3, Feb. 28, 2014, pp. 623-628.

Migliore et al., "A Revaluation of Frame Difference in Fast and Robust Motion Detection", Proceedings of the 4th ACM international workshop on Video surveillance and sensor networks, Oct. 27, 2006, pp. 215-218.

Shih et al., "Motion-Based Background Modeling for Moving Object Detection on Moving Platforms", Proceedings of 16th International Conference on Computer Communications and Networks, Aug. 13-16, 2007, pp. 1178-1182.

Kameda et al., "A Human Motion Estimation Method Using 3-Successive Video Frames", Proceedings of International Conference on Virtual Systems and Multimedia, Jan. 1996, pp. 135-140.

\* cited by examiner

METHOD AND APPARATUS FOR PROCESSING A VIDEO FRAME IN A VIDEO FILE

FIELD OF THE INVENTION

Embodiments of the present invention relate to the field of video file processing, and more specifically, relate to a method and apparatus for processing a video frame in a video file.

BACKGROUND OF THE INVENTION

With the constant development of computer technologies, particularly video technologies, it is very crucial for many application scenarios to segment an object (foreground) from a background. One example is that based on this technology, a lot of video effects, background bokeh or replacement of a real scene with another background for privacy issues or fun issues, can be easily created. Another example is to create visual effects for living images composed of a mini-video. For example, with the segmentation of a foreground object (say a moving person) from a background which is still or moves slowly, desired visual effects for the mini-videos may be created by blurring the background or turning the background into gray for having foreground pop-out, etc.

The prior art provides two common segmentation methods: one method based on background modeling and the other based on motion estimation. Both of the two methods have restrictions on background motion. However, even a user holds a camera device stably, some unconscious shaking might be unavoidable, which will introduce unwanted background motion into video. Thus, foreground object segmentation becomes difficult with the prior art.

SUMMARY OF THE INVENTION

In order to solve the above problems in the prior art, the present invention provides the following solution.

According to a first aspect of the present invention, there is provided a method for processing a video frame in a video file, comprising: for each predetermined numerical value of one or more predetermined numerical values, comparing the video frame with a video frame spaced prior to the video frame by the predetermined numerical value of frames to obtain a first inter-frame difference; comparing the video frame with a video frame spaced after the video frame by the predetermined numerical value of frames to obtain a second inter-frame difference; and for each pixel of the video frame, obtaining a confidence map associating the video frame by the predetermined numerical value based on a smaller value of the first inter-frame difference and the second inter-frame difference; and determining, at least based on a value of each pixel in one or more of the confidence maps associated with a corresponding predetermined numerical value, whether the pixel belongs to a foreground.

In an alternative implementation of the present invention, the determining whether the pixel belongs to a foreground is also based on a value of the each pixel in a confidence map associated with a background, and the confidence map associated with the background is obtained through the following steps: selecting a plurality of consecutive video frames that include the video frame in the video file; building a background of the video file based on the plurality of consecutive video frames; and comparing the video frame with the background to obtain a confidence map associated with the background.

In an alternative implementation of the present invention, the plurality of consecutive video frames further include a video frame spaced prior to the video frame with a maximum predetermined numerical value of the one or more predetermined numerical values of frames, and a video frame spaced after the video frame with the maximum numerical value of frames.

In an alternative implementation of the present invention, the determining, at least based on a value of each pixel in one or more of the confidence maps associated with a corresponding predetermined numerical value, whether the pixel belongs to a foreground comprises: when respective values of the pixel in respective confidence maps are all greater than a first threshold, determining that the pixel belongs to the foreground; and when respective values of the pixel in respective confidence maps are all smaller than a second threshold, determining that the pixel belongs to the background.

In an alternative implementation of the present invention, the determining, at least based on a value of each pixel in one or more of the confidence maps associated with a corresponding predetermined numerical value, whether the pixel belongs to the foreground comprises: (i) when respective values of the pixel in respective confidence maps are not all greater than the first threshold or not all smaller than the second threshold, where an adjacent domain of the pixel only has pixels determined to be the foreground, taking the maximum value in the respective values as a probabilistic value for the pixel belonging to the foreground; where an adjacent domain of the pixel only has a pixel determined to be the background, taking a minimum value in the respective values as a probabilistic value for the pixel belonging to the foreground; otherwise, taking a mean value of the respective values as a probabilistic value for the pixel belonging to the foreground; (ii) when the probabilistic value for the pixel belonging to the foreground is greater than a third threshold, determining that the pixel belongs to the foreground; and (iii) when the probabilistic value for the pixel belonging to the foreground is less than a third threshold, determining that the pixel belonging to the background.

In an alternative implementation of the present invention, wherein the building a background of the video file based on the plurality of consecutive video frames comprises: determining a relative motion vector of each video frame in the plurality of consecutive video frames relative to a preceding video frame; aligning the plurality of video frames spatially based on the relative motion vector to determine corresponding pixel points of a same spatial point on each video frame of the plurality of video frames; clustering all pixel points corresponding to the each spatial point, to obtain pixel points associated with the background corresponding to the each spatial point; and building the background of the video file based on the obtained pixel points associated with the background corresponding to the each spatial point.

In an alternative implementation of the present invention, wherein the comparing the video frame with video frames spaced prior to/after it by the predetermined numerical value of frames so as to obtain the first/second inter-frame difference comprises: taking an absolute value of the difference regarding each pixel between the video frame and the video frames spaced prior to/after it by the predetermined numerical value of frames with respect to a same attribute value as the first/second inter-frame difference.

In an alternative implementation of the present invention, the attribute value includes a grayscale value.

In an alternative implementation of the present invention, wherein the obtaining a confidence map associating the video frame by the predetermined numerical value based on a smaller value of the first inter-frame difference and the second inter-frame difference further comprises: normalizing each smaller value to form a confidence map associated with the predetermined numerical value.

In an alternative implementation of the present invention, comparing the video frame and the background to obtain a confidence map associated with the background further comprises: normalizing absolute values of differences between the video frame and the background with respect to the same attribute value on each pixel so as to obtain a confidence map associated with the background.

In an alternative implementation of the present invention, the third threshold is a value between the first threshold and the second threshold.

According to another aspect of the present invention, there is provided an apparatus for processing a video frame in a video file, comprising: a first class of confidence map obtaining unit and a foreground determining unit, wherein the first class of confidence map obtaining unit is configured to, for each predetermined numerical value of one or more predetermined numerical values, compare the video frame with a video frame spaced prior to the video frame by the predetermined numerical value of frames to obtain a first inter-frame difference; compare the video frame with a video frame spaced after the video frame by the predetermined numerical value of frames to obtain a second inter-frame difference; and for each pixel of the video frame, obtain a confidence map associating the video frame by the predetermined numerical value based on a smaller value of the first inter-frame difference and the second inter-frame difference; and the foreground determining unit is configured to determine, at least based on a value of each pixel in one or more of the confidence maps associated with a corresponding predetermined numerical value, whether the pixel belongs to a foreground.

According to a further aspect of the present invention, there is provided a non-transient computer-readable medium including a computer program product, the computer program product including a machine-executable instruction that, when being executed, causes a machine to perform the method according to a first aspect of the present invention.

According to a still further aspect of the present invention, there is provided an apparatus, comprising: at least one processor; and at least one memory including a computer program code; the at least one memory and the computer program code being configured to cause, with the at least one processor, the apparatus to at least perform the method according to the first aspect of the present invention.

It would be appreciated through the description below that when it is desired to segment a foreground from a current video frame of a video file, even if the video file is relatively large or the captured video has jitter, the segment may also be implemented according to the embodiments of the present invention more accurately.

BRIEF DESCRIPTION OF THE ACCOMPANYING DRAWINGS

The patent application file contains at least one drawing executed in color. Copies of this patent application with color drawing(s) will be provided by the Office upon request and payment of the necessary fee. Through more detailed description of the exemplary embodiments of the present invention with reference to the accompanying drawings, the above and other objectives, features and advantages of the present invention will become more apparent, wherein in the exemplary embodiments of the present invention, like reference numerals generally represent identical components.

Figure 12:
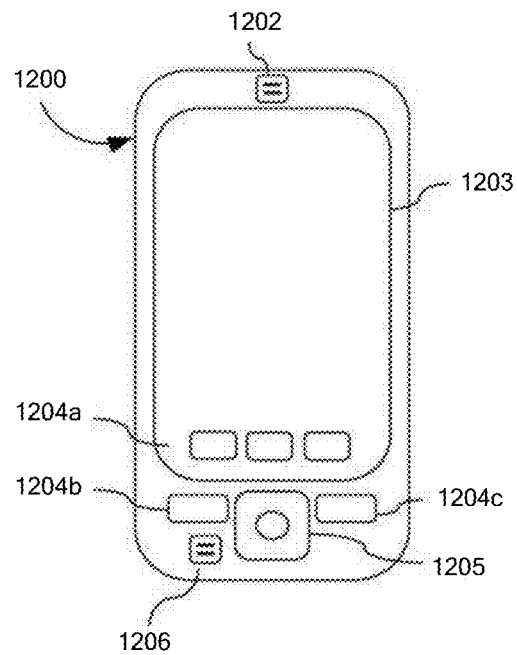
FIG. 12 shows a user terminal 1200 adapted to implementing embodiments of the present invention.
Figure 13:
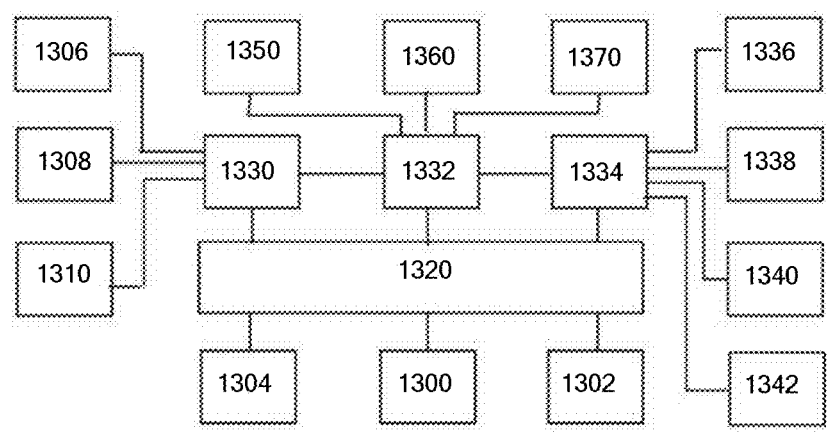

FIG. 13 schematically shows a configuration diagram of a user terminal as shown in FIG. 12.

DETAILED DESCRIPTION OF THE PREFERRED EMBODIMENTS

Hereinafter, the preferred embodiments of the present invention will be described in more detail with reference to the accompanying drawings. Although preferred embodiments of the present invention are shown in the drawings, it should be understood that the present invention may be implemented in various forms, instead of being limited by the embodiments illustrated here. On the contrary, provision of these embodiments is to make the present invention more thorough and complete such that the scope of the present invention can be completely conveyed to those skilled in the art.

Figure 1:
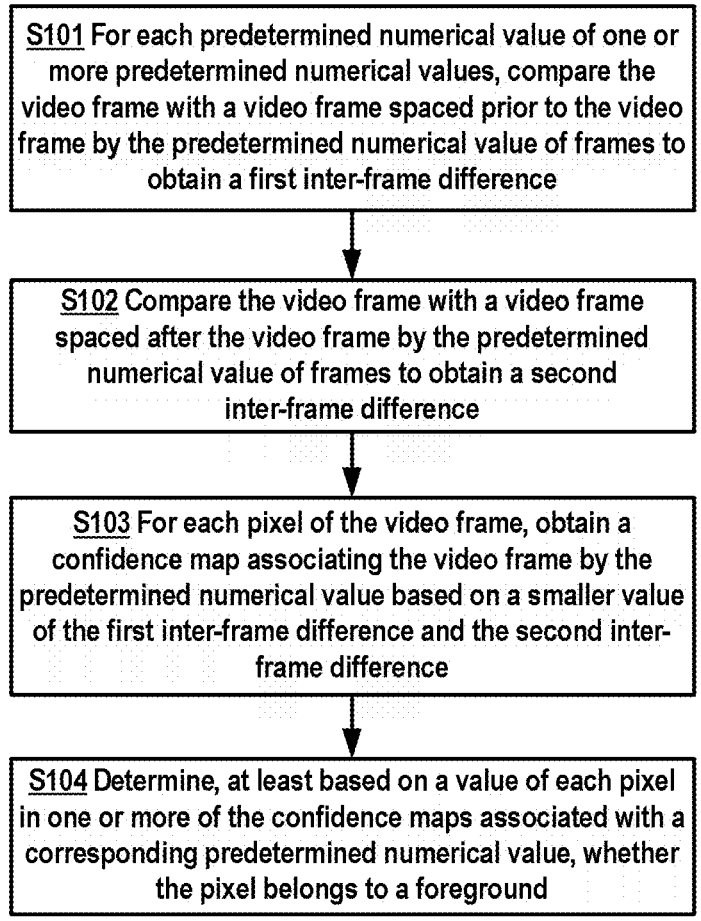
FIG. 1 shows a flow diagram of a method 100 for processing a video frame in a video file according to one exemplary embodiment of the present invention.

FIG. 1 shows a flow diagram of a method 100 for processing a video frame in a video file according to an exemplary embodiment of the present invention. The "video file" here may be various types and formats of video files, including a plurality of video frames. For any video frame therein, when it is needed to discriminate background/foreground of the video frame, processing according to method 100 below is performed. First, in step S101, for each predetermined numerical value in one or more predetermined numerical values, comparing the video frame and a video frame spaced prior to the video frame by a predetermined numerical value of frames so as to obtain a first inter-frame difference. It would be appreciated that the predetermined numerical value here may be any integer value such as 0, 1, and 2. The first inter-frame difference may be obtained by deducting two frames (or a differential operation). For example, in an alternative implementation, an absolute value of a difference between the video frame and a video frame spaced prior to the video frame by the predetermined numerical value of frames with respect to the same attribute value (e.g., grayscale value or brightness value) on each pixel may be taken as the first inter-frame difference.

Next, the method 100 proceeds to step S102 to compare the video frame with a video frame spaced after the video frame by the predetermined numerical value of frames to obtain a second inter-frame difference. Step S102 is implemented in a manner similar to step S101.

Then, the method 100 proceeds to step S103 to obtain, for each pixel of the current video frame and based on a smaller one of the first inter-frame difference and the second inter-frame difference, a confidence map of the video frame associated with the predetermined numerical value.

Figure 2:
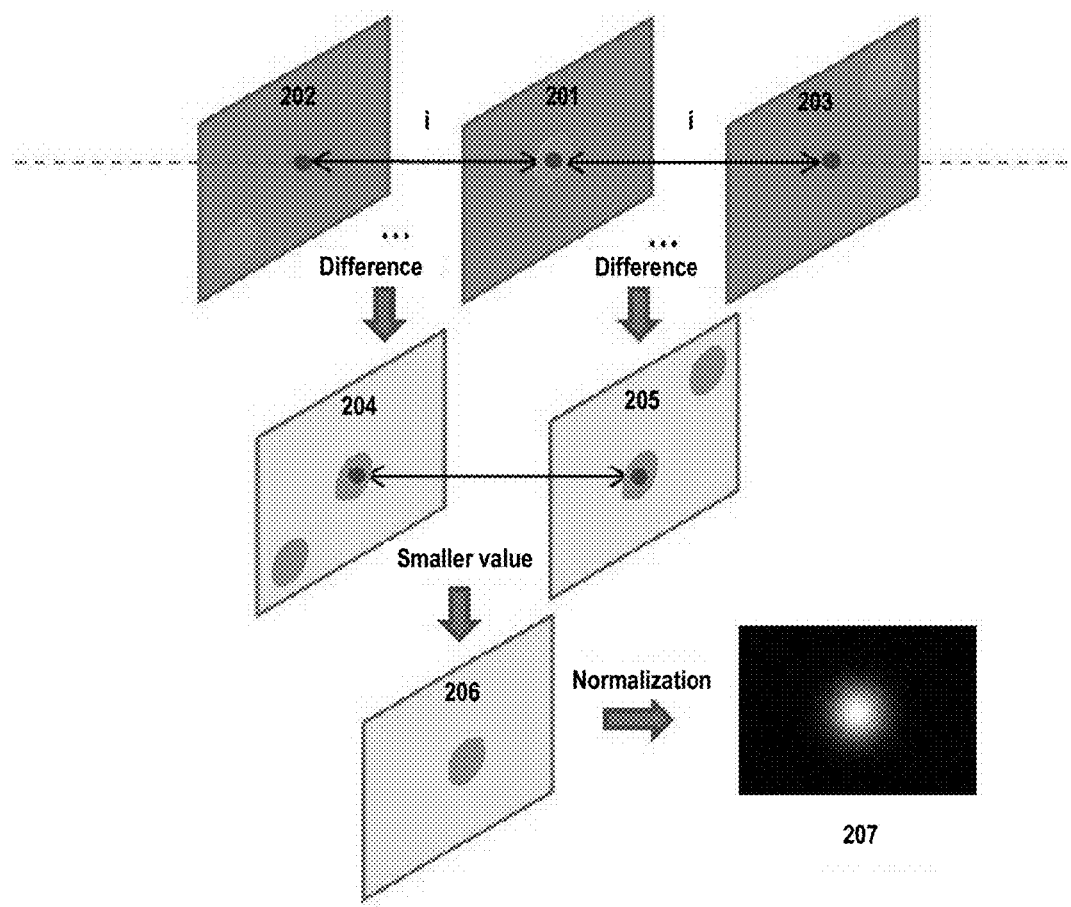
FIG. 2 shows a specific example of obtaining a confidence map of a current frame for a predetermined numerical value i according to one exemplary embodiment of the present invention.

In order to facilitate understanding steps S101-S103, illustration will be made with reference to FIG. 2. FIG. 2 shows a specific example of obtaining a confidence map of the current frame for a predetermined numerical value i according to one exemplary embodiment of the present invention. As shown in FIG. 2, in order to determine which pixels on the current frame 201 belong to the foreground (in this example, the foreground is represented with an oval region), a video frame 202 spaced prior to the current 201 by a predetermined numerical value i and a video frame 203 spaced after the current frame by the same predetermined numerical value i are selected and compared with the current video frame 201 (differential operation), respectively, thereby obtaining the first inter-frame difference 204 and the second inter-frame difference 205. Next, a smaller value (e.g., performing an "AND" operation) of the first inter-frame difference 204 and the second inter-frame difference 205 is taken for each pixel p to find a set of pixels in the current frame which have differences from the preceding and subsequent frames for comparison, e.g., the oval region in FIG. 206. Compared with the remaining portions, the grayscale value of the oval region in map 206 is relatively large, which indicates that it has a higher probability of belonging to the foreground, while the grayscale value of its remaining part of regions is relatively small, indicating that it has a lower probability of belonging to the foreground. Preferably, for subsequent processing, the values of respective pixels in map 206 may be normalized to form a confidence map 207.

Return to FIG. 1. Because steps S101-S103 are all performed for each predetermined numerical value to obtain corresponding confidence maps, one or more confidence maps may be correspondingly obtained based on one or more predetermined numerical values. Then, the method 100 proceeds to step S104 to determine, at least based on values of each pixel in one or more confidence maps associated with a corresponding predetermined numerical value, whether the pixel belongs to the foreground. Generally, when the selected predetermined numerical value is relatively small, the corresponding confidence map easily represents a fast moving object; while when the selected predetermined numerical value is relatively large, the corresponding confidence map easily represents a slowly moving object. Through appropriately selecting different predetermined numerical values, various confidence maps that more comprehensively reflect a foreground object may be obtained, such that foreground segmentation becomes more accurate.

Figure 3:
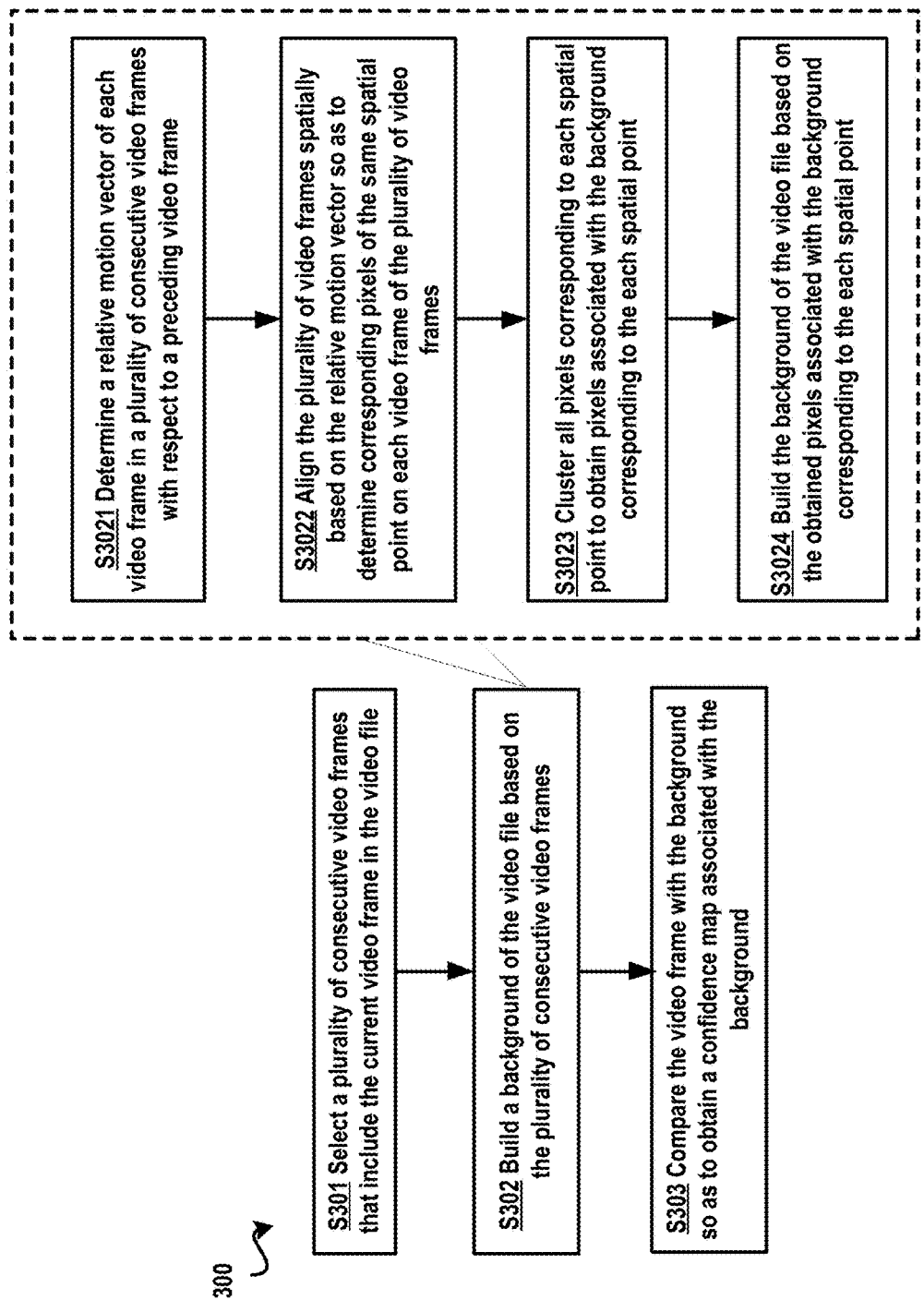
FIG. 3 shows a flow diagram of a method 300 for obtaining a confidence map associated with the background according to one exemplary embodiment of the present invention.

In addition, those skilled in the art would appreciate that when determining whether the pixel belongs to the foreground in step S104, it may also be based on other contents besides the values of each pixel in one or more confidence maps associated with the corresponding predetermined numerical value. For example, it may be additionally based on a confidence map associated with the background. FIG. 3 shows a flow diagram of a method 300 for obtaining the confidence map associated with the background according to the exemplary embodiments of the present invention. As shown in FIG. 3, the method 300 first proceeds to step S301 to select a plurality of consecutive video frames including the current video frame in the video file. A preferred manner is specified as follows: for example, suppose the maximum numerical value in one or more predetermined numerical values in step S101 of the above method 100 is M, then the selected plurality of consecutive video frames include a video frame spaced prior to the current video frame by M frames, and a video frame spaced after the current video frame by M frames.

Next, the method 300 proceeds to step S302 to build a background of the video file based on the plurality of consecutive video frames. Those skilled in the art should understand, various methods in the prior art may be employed to build a background of the video file. For example, in an alternative embodiment, the background of the video file may be built through the following steps:

S3021: determining a relative motion vector of each video frame in a plurality of consecutive video frames with respect to a preceding video frame;

S3022: aligning the plurality of video frames spatially based on the relative motion vector so as to determine corresponding pixels of the same spatial point on each video frame of the plurality of video frames;

S3023: clustering all pixels corresponding to each spatial point to obtain pixels associated with the background corresponding to each spatial point; and S3024: building the background of the video file based on the obtained pixels associated with the background corresponding to each spatial point.

However, those skilled in the art should understand that the above manner is only an example of building a video file background, not a limitation. Actually, a background of a coarse granularity or fine granularity may be built as needed through various prior arts. Additionally, the built background may also be updated over time.

Then, the method 300 proceeds to step S303 to compare the video frame with the background so as to obtain a confidence map associated with the background. Similar to step S101 in the method 100, the comparison in step S303 may also be performed in a manner of deducting the two frames (or a differential operation).

Figure 4:
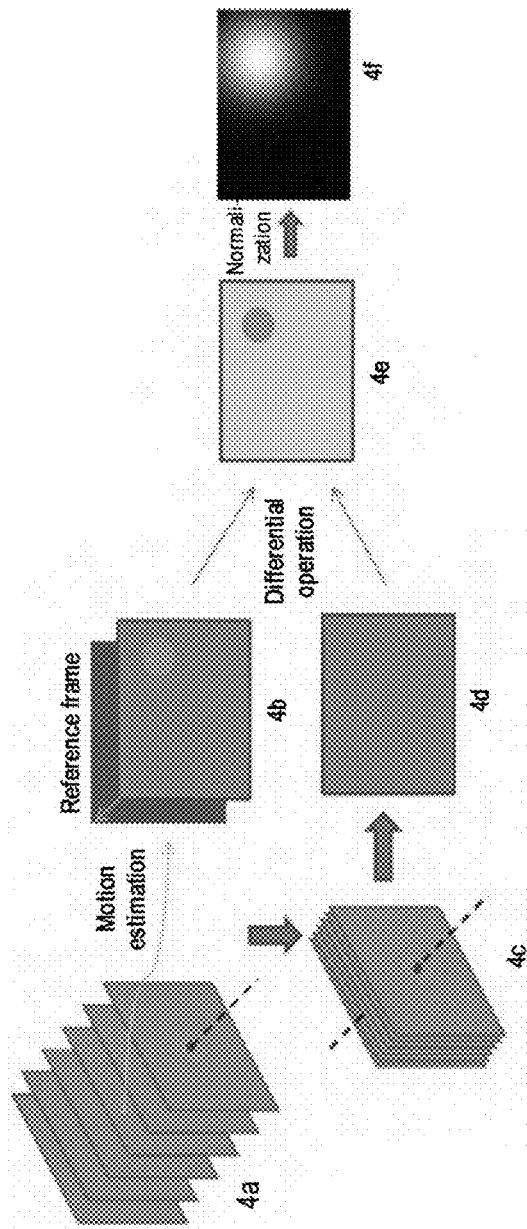
FIG. 4 shows a specific example of obtaining a confidence map associated with the background according to one exemplary embodiment of the present invention.

In order to facilitate understanding steps S301-S303, FIG. 4 is referenced for illustration. FIG. 4 shows a specific example of obtaining a confidence map associated with a background according to one exemplary embodiment of the present invention. As shown in FIG. 4, a plurality of consecutive video frames including the current frame in FIG. 4a are subject to motion estimation (in the present example, the foreground is represented with an oval region), so as to align (as shown in FIG. 4b) each frame to a reference frame (generally the first frame in the plurality of consecutive video frames in FIG. 4a), thereby obtaining a plurality of aligned video frames (4c). For a plurality of aligned video frames in FIG. 4c, a rebuilt background 4d is obtained through a manner of majority voting. Likewise, in an alternative implementation, an absolute value of a difference regarding each pixel between the video frame and the background 4d with respect to the same attribute value (e.g., grayscale value or brightness value), to find a set of pixels in the current frame which have differences with the background 4d, e.g., the oval region in FIG. 4e. Compared with the remaining part, the grayscale value of the oval region in FIG. 4e is relatively large, indicating that its probability of belonging to the foreground is relatively high; while the remaining part of region has a relatively small grayscale value, indicating that its probability of belonging to the foreground is relatively low. Preferably, for subsequent processing, the probability values of respective pixels in FIG. 4e may also be normalized to form the confidence map 4f.

It would be understood that where the foreground object moves slowly, it would be advantageous that the step S104 of the method 100 also considers a confidence map associated the background besides the one or more confidence maps associated with the predetermined numerical value to comprehensively determine which pixels of the current frame belong to the foreground.

Figure 5:
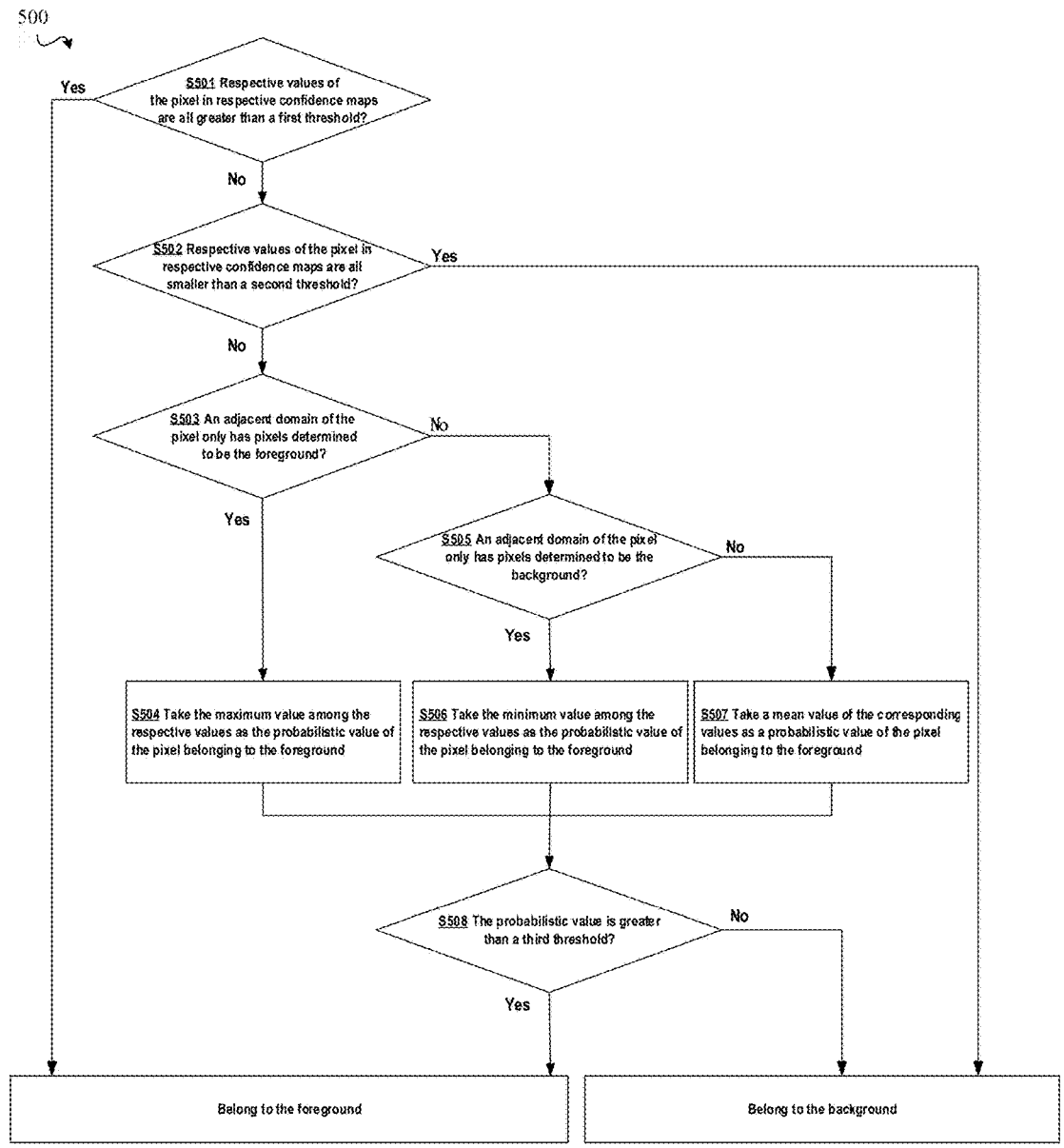
FIG. 5 shows a flow diagram 500 for determining whether each pixel belongs to the foreground based on one or more confidence maps according to one exemplary embodiment of the present invention.

FIG. 5 shows a flow diagram 500 of determining whether each pixel belongs to a foreground based on one or more confidence maps according to one exemplary embodiment of the present invention. As shown in the diagram 500, when respective values of the pixel in respective confidence maps are all greater than a first threshold, it is determined that the pixel belongs to the foreground (step S501, yes); otherwise (step S501, no); when the respective values of the pixel in respective confidence maps are all smaller than a second threshold, it is determined that the pixel belongs to the background (step S502, yes). It should be noted that respective confidence maps involved in step S501/S502 may not only be the one or more confidence maps associated with a predetermined numerical value obtained in step S103 of the method 100, but also may be confidence maps associated with the background obtained in step S303 of method 300.

If not all of the respective values of the pixel in respective confidence maps are greater than the first threshold or smaller than the second threshold (step S502, no), (i) when an adjacent domain of the pixel only has pixels determined to be the foreground (step S503, yes), taking the maximum value among the respective values as the probabilistic value of the pixel belonging to the foreground (step 504);

(ii) when an adjacent domain of the pixel only has pixels determined to be the background (step S503, no; step S505, yes), taking a minimum value among the respective values as the probabilistic value of the pixel belonging to the foreground (step S506);

(iii) otherwise (step S505, no), taking a mean value of the corresponding values as a probabilistic value of the pixel belonging to the foreground (step S507).

Next, the method 500 judges whether the probabilistic value of the pixel belonging to the foreground is greater than a third threshold; when it is judged yes (step S508, yes), it is determined that the pixel belongs to the foreground; otherwise (step S508, no), it is determined that the pixel belongs to the background.

Those skilled in the art may understand that the first threshold, the second threshold, and the third threshold involved in method 500 may be set as required. Generally, the third threshold is a value between the first threshold and the second threshold. Additionally, the term "adjacent domain" mentioned in method 500 refers to 8 neighboring pixels above it, below it, to its left, to its right and in diagonal directions, or called 8-adjacent domain.

Figure 6:
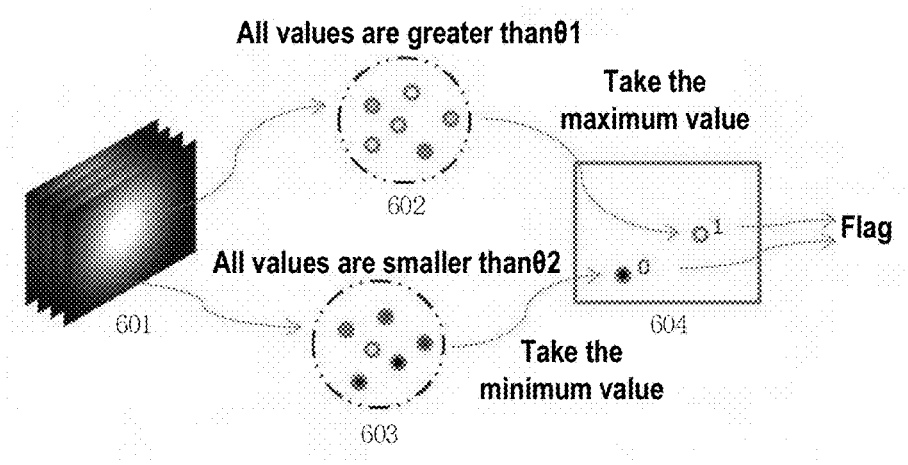
FIGS. 6-7 show a specific example of an exemplary method according to FIG. 5.
Figure 7:
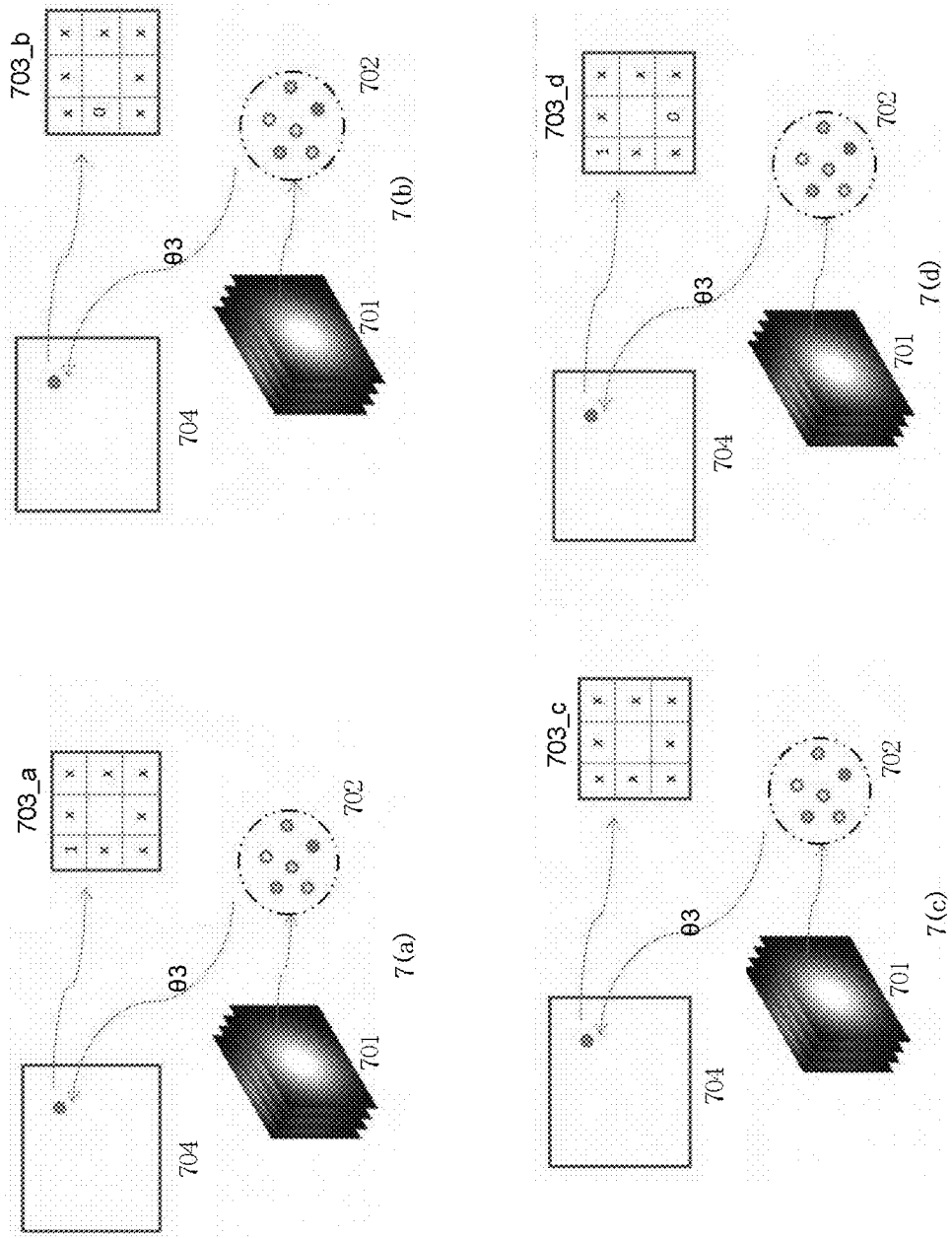

FIGS. 6-7 show specific examples of the exemplary method according to FIG. 5. As shown in FIG. 6, based on one or more confidence maps 601 (might include or might not include confidence maps associated with the background) that have been obtained, statistical analysis is performed on values of each pixel on the one or more confidence maps 601; when all values are greater than a predetermined value $\theta 1$, as shown in 602, a maximum value therein may be used as a probabilistic value of the pixel belonging to the foreground, and a decision corresponding to the pixel is set to 1 in a foreground decision map 604 of the current video frame, i.e., it is believed that the pixel belongs to the foreground. Otherwise, as shown in 603, when all values are less than a predetermined threshold $\theta 2$, a minimum value therein may be used as a probabilistic value of the pixel belonging to the foreground, and the decision corresponding to the pixel is set to 0 in the foreground decision map 604 of the current video frame, i.e., the pixel is taken as belonging to the background. When the confidence map is normalized, value ranges of $\theta 1$ and $\theta 2$ are between 0 to 1, typically $\theta 1 > \theta 2$.

Hereinafter refer to FIG. 7. If respective values of a pixel in the one or more confidence maps 701 are not all greater than $\theta 1$ or not all less than $\theta 2$ (702), then as shown in FIG. 7a, when its 8-adjacent domain has and only has pixels determined to be the foreground (map 703_a), a maximum value in respective values is used as a probabilistic value of the pixel belonging to the foreground. If this probabilistic value is greater than a predetermined threshold $\theta 3$, the decision corresponding to the pixel may be set to 1 in the foreground decision map 704 of the current video frame, i.e., the pixel is believed to belong to the foreground; if it is less than the predetermined threshold $\theta 3$, the decision corresponding to the pixel may be set to 0 in the foreground decision map 704 of the current video frame, i.e., the pixel is believed to belong to the background.

On the contrary, as shown in FIG. 7b, when the 8-adjacent domain of the pixel has and only has pixels determined to be the background (map 703_b), a minimum value among respective values is used as the probabilistic values of the pixel belonging to the foreground. If this probabilistic value is less than a predetermined threshold $\theta 3$, the decision corresponding to the pixel may be set to 0 in the foreground decision map 704 of the current video frame, i.e., it is believed that the pixel belongs to the background; if it is greater than the predetermined threshold $\theta 3$, the decision corresponding to the pixel may be set to 1 in the foreground decision map 704 of the current video frame, i.e., it is believed that the pixel belongs to the foreground.

Or, as shown in FIG. 7c, when the 8-adjacent domain of the pixel does not have pixels that are determined to be the foreground or background (map 703_c), a mean value of respective values is used as a probabilistic value of the pixel belonging to the foreground. A decision corresponding to the pixel is set in the foreground decision map 704 based on its comparison with the value of $\theta 3$.

Or otherwise, as shown in FIG. 7d, the 8-adjacent domain of the pixel not only has pixels being determined to be the foreground but also has pixels being determined to be the background (map 703_d), a mean value of respective values is used as a probabilistic value of the pixel belonging to the foreground. A decision corresponding to the pixel is set in the foreground decision map 704 based on its comparison with the value of θ3.

Figure 8:
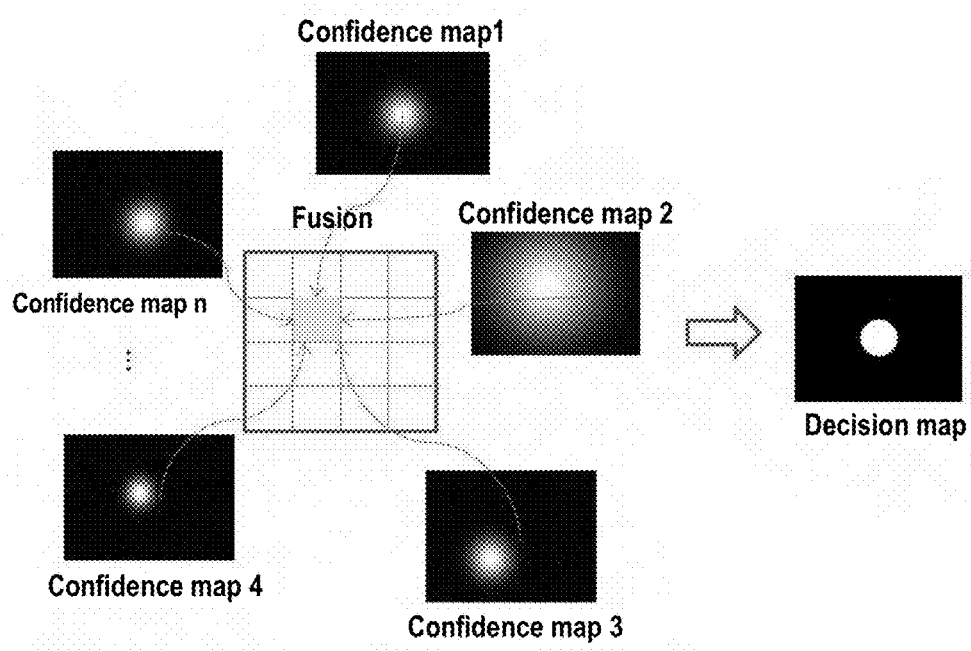
FIG. 8 shows a schematic decision map of foreground segmentation from a present video frame based on a plurality of confidence maps according to an exemplary embodiment of the present invention.

FIG. 8 shows a schematic decision map of foreground segmentation from a current video frame based on a plurality of confidence maps according to exemplary embodiments of the present invention. As shown in FIG. 8, after one or more confidence diagrams are obtained for example by fusing the manners described through FIGS. 5-7, a schematic decision map of the current frame may be obtained. From this decision map, it may be clearly derived whether each pixel in the current video frame belongs to the foreground or the background.

Figure 9:
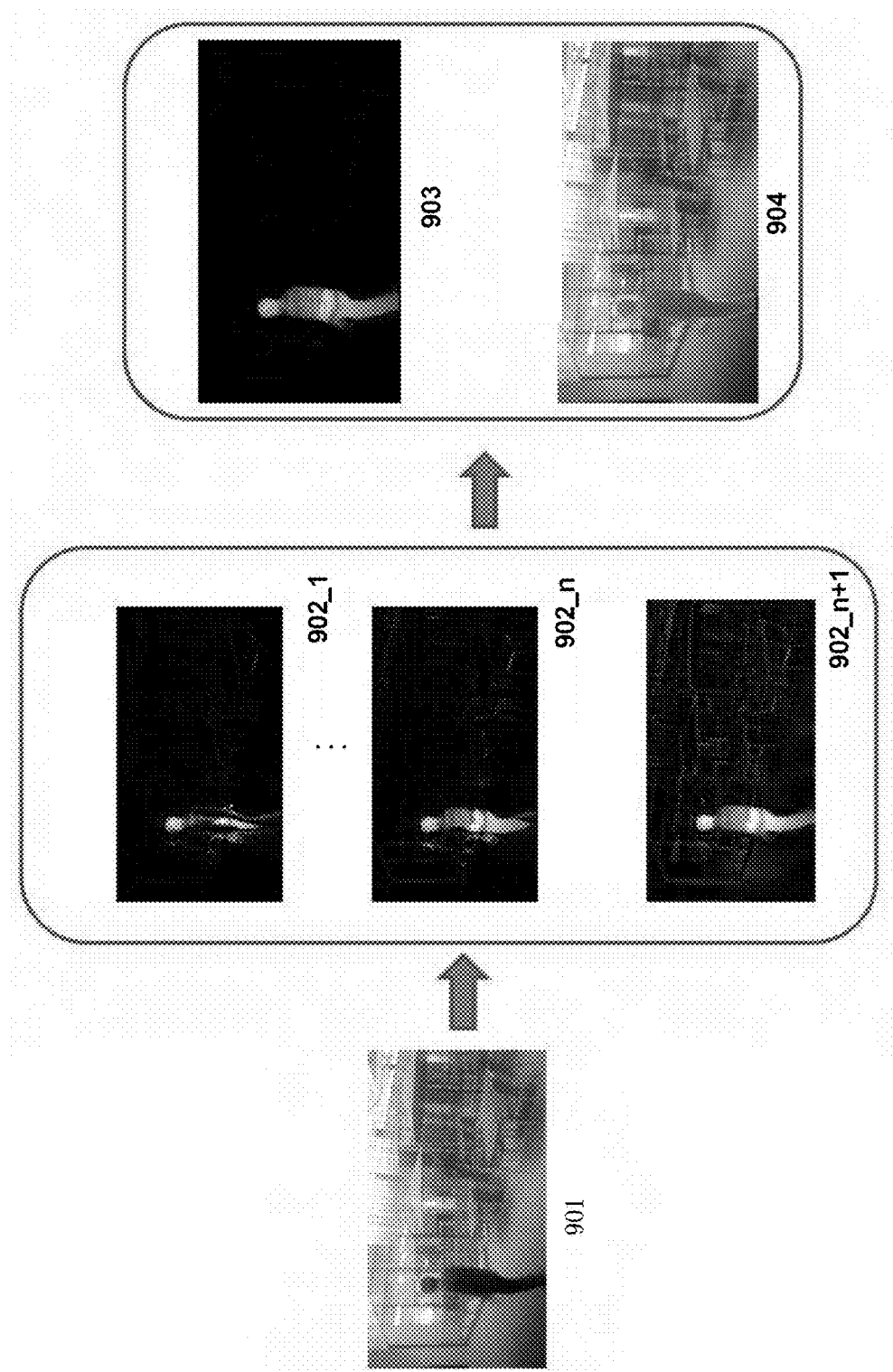
FIG. 9 shows a general schematic diagram for processing a video frame according to an exemplary embodiment of the present invention.

FIG. 9 shows a general schematic diagram for processing a video frame according to an exemplary embodiment of the present invention. As shown in FIG. 9, for a to-be-processed video frame 901, first, one or more confidence maps 902_1-902_*n* associated with a predetermined numerical value are obtained through steps S101-S103 of the method 100; alternatively, one or more confidence maps 902_*n*+1 associated with the background may be additionally obtained through steps S301-S303 of the method 300. Based on the analysis of all obtained confidence maps 902_1-902_*n*+1 (for example, through method 500), a probabilistic 903 of each pixel in the video frame belonging to the foreground may be obtained, so as to complete segmentation 904 of the foreground of the video frame from the background.

Next, a schematic block diagram of an apparatus 1000 for processing a video frame in a video file according to an exemplary embodiment of the present invention will be further described with reference to FIG. 10.

As shown in the figure, the apparatus 1000 comprises: a first class of confidence map obtaining unit 1010 and a foreground determining unit 1020, wherein the first class of confidence map obtaining unit 1010 is configured to, for each predetermined numerical value of one or more predetermined numerical values, compare the video frame with a video frame spaced prior to the video frame by the predetermined numerical value of frames to obtain a first inter-frame difference; compare the video frame with a video frame spaced after the video frame by the predetermined numerical value of frames to obtain a second inter-frame difference; and for each pixel of the video frame, obtain a confidence map associating the video frame by the predetermined numerical value based on a smaller value of the first inter-frame difference and the second inter-frame difference; and the foreground determining unit 1020 is configured to determine, at least based on a value of each pixel in one or more of the confidence maps associated with a corresponding predetermined numerical value, whether the pixel belongs to a foreground.

In an alternative implementation of the present invention, the foreground determining unit 1020 is further configured to determine whether the pixel belongs to the foreground based on a value of the each pixel in a confidence map associated with a background, and the apparatus 1000 further comprises: a selecting unit 1030 configured to select a plurality of consecutive video frames that include the video frame in the video file; and a building unit 1040 configured to build a background of the video file based on the plurality of consecutive video frames; and a second class of confidence map obtaining unit 1050 configured to compare the video frame with the background to obtain a confidence map associated with the background.

In an alternative implementation of the present invention, the plurality of consecutive video frames further include a video frame spaced prior to the video frame with a maximum predetermined numerical value of the one or more predetermined numerical values of frames, and a video frame spaced after the video frame with the maximum numerical value of frames.

In an alternative implementation of the present invention, the first determining unit 1020 comprises: a first determining unit 1021 configured to, when respective values of the pixel in respective confidence maps are all greater than a first threshold, determine that the pixel belongs to the foreground; and a second determining unit 1022 configured to, when respective values of the pixel in respective confidence maps are all smaller than a second threshold, determine that the pixel belongs to the background.

In an alternative implementation of the present invention, the foreground determining unit 1020 comprises: a probabilistic determining unit 1023 configured to, when respective values of the pixel in respective confidence maps are not all greater than the first threshold or not all smaller than the second threshold, where an adjacent domain of the pixel only has pixels determined to be the foreground, take the maximum value in the respective values as a probabilistic value for the pixel belonging to the foreground; where an adjacent domain of the pixel only has a pixel determined to be the background, take a minimum value in the respective values as a probabilistic value for the pixel belonging to the foreground; otherwise, take a mean value of the respective values as a probabilistic value for the pixel belonging to the foreground; a third determining unit 1024 configured to, when the probabilistic value for the pixel belonging to the foreground is greater than a third threshold, determine that the pixel belongs to the foreground; a fourth determining unit 1025 configured to, when the probabilistic value for the pixel belonging to the foreground is less than a third threshold, determine that the pixel belonging to the background.

In an alternative implementation of the present invention, the building unit 1040 comprises: a motion vector determining unit 1041 configured to determine a relative motion vector of each video frame in the plurality of consecutive video frames relative to a preceding video frame; an aligning unit 1042 configured to align the plurality of video frames spatially based on the relative motion vector to determine corresponding pixel points of a same spatial point on each video frame of the plurality of video frames; a clustering unit 1043 configured to cluster all pixel points corresponding to the each spatial point, to obtain pixel points associated with the background corresponding to the each spatial point; and a sub-building unit 1044 configured to build the background of the video file based on the obtained pixel points associated with the background corresponding to the each spatial point.

In an alternative implementation of the present invention, comparing the video frame with video frames spaced prior to/after it by the predetermined numerical value of frames so as to obtain the first/second inter-frame difference comprises: taking an absolute value of the difference regarding each pixel between the video frame and the video frames spaced prior to/after it by the predetermined numerical value of frames with respect to a same attribute value as the first/second inter-frame difference.

In an alternative implementation of the present invention, the attribute value includes a grayscale value.

In an alternative implementation of the present invention, the obtaining a confidence map associating the video frame by the predetermined numerical value based on a smaller value of the first inter-frame difference and the second inter-frame difference further comprises: normalizing each smaller value to form a confidence map associated with the predetermined numerical value.

In an alternative implementation of the present invention, the second class of confidence map obtaining unit 1050 further comprises: a normalizing unit 1051 configured to normalize absolute values of differences between the video frame and the background with respect to the same attribute value on each pixel so as to obtain a confidence map associated with the background.

In an alternative implementation of the present invention, the third threshold is a value between the first threshold and the second threshold.

Figure 10:
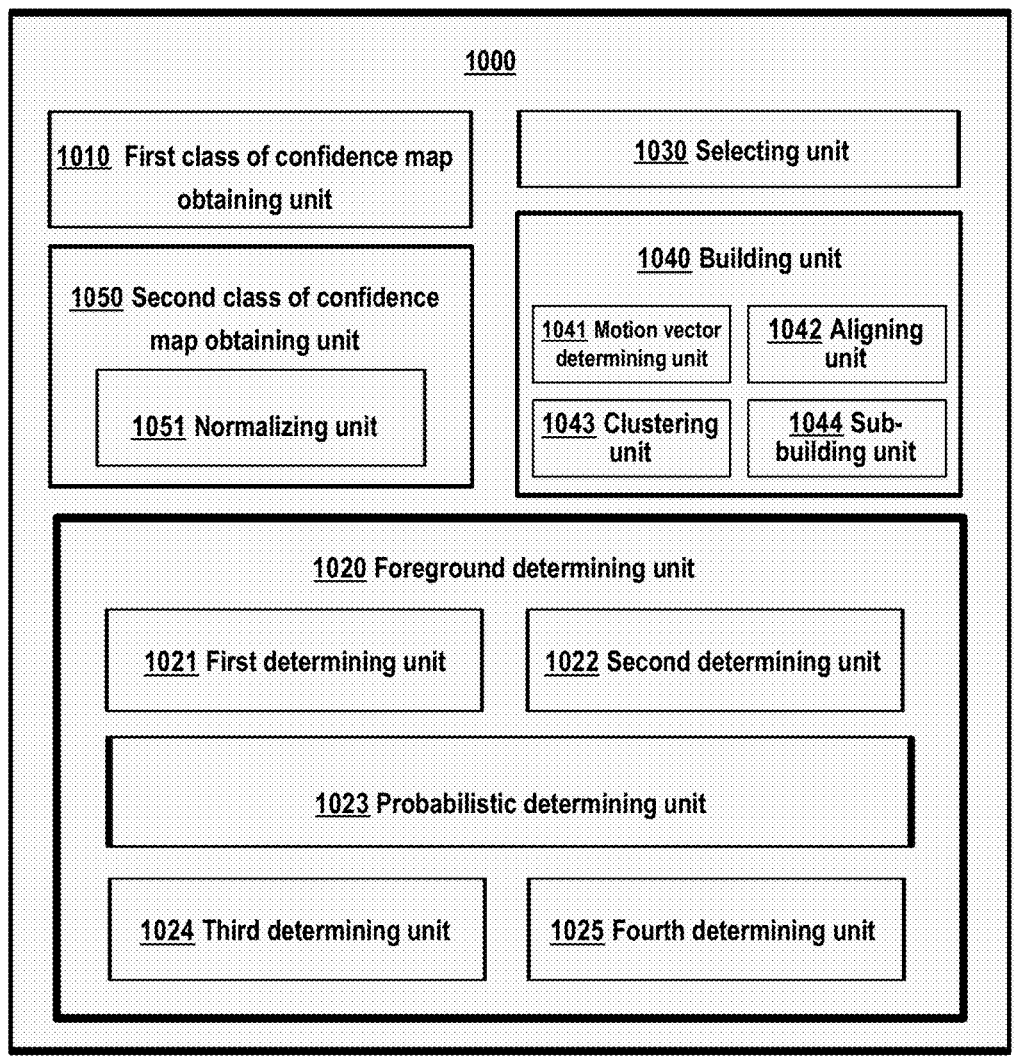
FIG. 10 shows a schematic block diagram of an apparatus 1000 for processing a video frame in a video file according to an exemplary embodiment of the present invention.

It should be noted that for the convenience of description, the apparatus 1000 in FIG. 10 shows a selecting unit 1030, a building unit 1040, and a second class of confidence map obtaining unit 1050, but it should be understood that these units are not essential, but alternative or optional. Likewise, although it is illustrated in apparatus 1000 in FIG. 10 that the foreground determining unit 1020 comprises a first determining unit 1021, a second determining unit 1022, a probability determining unit 1023, a third determining unit 1024, and a fourth determining unit 1025, units 1021-1025 are optional; although it is illustrated in the apparatus 1000 that the building unit 1040 comprises a motion vector determining unit 1041, an aligning unit 1042, a clustering unit 1043, and a sub-building unit 1044, units 1041-1044 are optional; although it is illustrated in apparatus 1000 that the second class of confidence map determining unit 1050 comprises a normalizing unit 1051, the unit 1051 is optional; the scope of the present invention is not limited in this aspect.

Moreover, the term "unit" here may not only be a hardware module, but also be a software unit module. Correspondingly, the apparatus 1000 may be implemented through various manners. For example, in some embodiments, the apparatus 1000 may be implemented partially or completely by software and/or firmware, e.g., implemented as a computer program product embodied on a computer readable medium. Alternatively or additionally, the apparatus 1000 may be partially or completely implemented based on hardware, e.g., implemented as an integrated circuit (IC), an application-specific integrated circuit (ASIC), a system on chip (SOC), a field programmable gate array (FPGA), etc. The scope of the present invention is not limited in this aspect.

Figure 11:
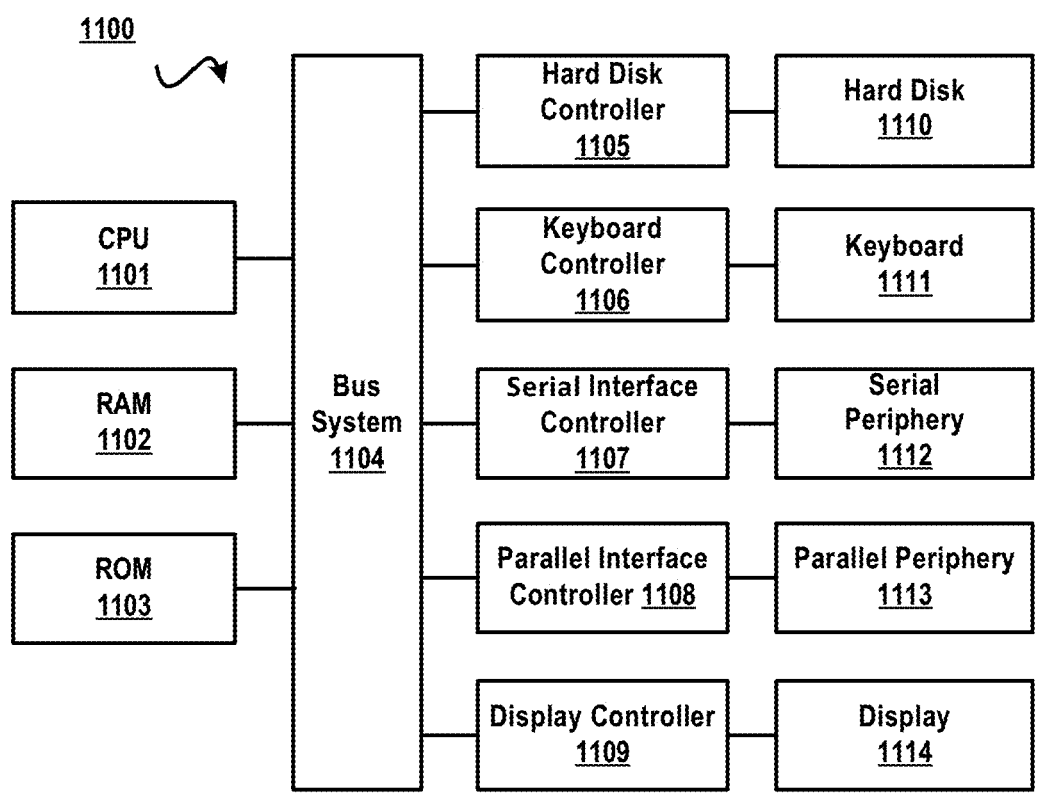
FIG. 11 shows a schematic block diagram of a computer system 1100 adapted to implementing embodiments of the present invention.

The method and apparatus for processing a video file according to the present invention may be implemented on various kinds of electronic devices. For example, they may be implemented on a computer. FIG. 11 shows a schematic block diagram of a computer system 1100 adapted for implementing the embodiments of the present invention. For example, the computer system 1100 as shown in FIG. 11 may be used for implementing various components of the apparatus 1000 for processing a video file as described above, and may also be used for solidifying or implementing various steps of methods 100-300 for processing a video file as described above.

As shown in FIG. 11, the computer system comprises: a CPU (Central Processing Unit) 1101, a RAM (Random Access Memory) 1102, a ROM (Read Only Memory) 1103, a system bus 1104, a hard disk controller 1105, a keyboard controller 1106, a serial interface controller 1107, a parallel interface controller 1108, a display controller 1109, a hard disk 1110, a keyboard 1111, a serial peripheral device 1112, a parallel peripheral device 1113 and a display monitor 1114. Among these components, what coupled to the system bus 1104 are the CPU 1101, the RAM 1102, the ROM 1103, the hard disk controller 1105, the keyboard controller 1106, the serial interface controller 1107, the parallel controller 1108 and the display controller 1109. The hard disk 1110 is coupled to the hard disk controller 1105; the keyboard 1111 is coupled to the keyboard controller 11016; the serial peripheral device 1112 is coupled to the serial interface controller 1107; the parallel peripheral device 1113 is coupled to the parallel interface controller 1108; and the monitor 1114 is coupled to the monitor controller 1109. It should be understood that the structural block diagram in FIG. 11 is illustrated only for illustration purpose, and is not intended to limit the invention. In some cases, some devices can be added or reduced as required.

As described above, the apparatus 1000 may be implemented as pure hardware, e.g., a chip, an ASIC, an SOC, etc. These hardware may be integrated into a computer system 1100. Besides, the embodiments of the present invention may be implemented in a form of a computer program product. For example, various methods described with reference to FIGS. 1-8 may be implemented through a computer program product. The computer program product may be stored in, for example, RAM 1104, ROM 1104, hard disk 1110 as shown in FIG. 11 and/or any appropriate storage medium, or downloaded onto the computer system 1100 from an appropriate location through the network. The computer program product may include a computer code portion, including a program instruction executable by an appropriate processing device (e.g., CPU 1101 shown in FIG. 11). The program instruction at least may include instructions for implementing any of the steps in methods 100, 300, 500.

The spirit and principle of the present invention have been illustrated above with reference to a plurality of preferred embodiments. The method and apparatus for processing a video frame in a video file according to the present invention has many advantages with respect to the prior art. For example, it may segment a foreground more accurately even when the video file is relatively long or jitter occurs during capturing a video file, thereby satisfying various needs of the user.

An electronic device for implementing a method and an apparatus for processing a video file according to the present invention as mentioned above may also include a user terminal 1200 as shown in FIG. 12.

The user terminal 1200 comprises a loudspeaker or an earphone 1202, a microphone 1206, a touch screen 1203, and a set of keys 1204 which may include a virtual key 1204a, soft keys 1204b, 1204c, and a joystick 1205 or other types of navigation input devices.

FIG. 13 schematically shows a configuration diagram of the user terminal as shown in FIG. 12.

Now, FIG. 13 is referenced to describe internal components, software and protocol structure of the user terminal 1200. The user terminal 1200 has a controller 1300 in charge of overall operations of the user terminal and may be implemented using any commercially available CPU ("central processing unit"), DSP ("digital signal processor") or any other electronic programmable logic device. The controller 1300 has an associated electronic memory 1302 such as a RAM memory, a ROM memory, an EEPROM memory, a flash disk or any combination thereof. A memory 1302 is controlled by the controller 1302 for various purposes, one of which is storing program instructions and data for various software in the user terminal. The software comprises a real-time operating system 1320, a driver for a man-machine interface (MMI) 1334, an application processor 1332 and various applications. The application may comprise a message text editor 1350, a handwriting recognition (HWR)

application 1360, and various other applications 1370, e.g., applications for voice call, video call, sending and receiving a short messaging service (SMS), a multimedia messaging service (MMS) or an e-mail, web browsing, instant messaging transceiving application, telephone book application, calendar application, control panel application, camera application, one or more video games, notebook application, etc. It should be noted that two or more of the above applications may be executed by the same application.

MMI 1334 further comprises one or more hardware controllers, which cooperate, along with the MMI driver, with a first display 1336/1203, keypad 1338/1204, and various other I/O devices (such as a microphone, a loudspeaker, a vibrator, a ring generator, an LED indicator, etc.). As is already known, the user may operate a user terminal through such formed man-machine interface.

The software may also include various modules, protocol stacks, drivers, etc., which are jointly represented by 1330 and provide communication services (such as transmission, network and connectivity) for the RF interface 1306 and optionally for the Bluetooth interface 1308 and/or IrDA interface 1310, so as to be used for local connectivity. The RF interface 1306 comprises internal or external antennas and an appropriate radio circuit for establishing and maintaining a radio link destined to the base station. As is known to those skilled in the art, the radio circuit comprises a series of analog and digital electronic components, which together form a radio receiver and transmitter. These components for example include a bandpass filter, an amplifier, a frequency mixer, a local oscillator, a low-pass filter, an AD/DA converter, etc.

The user terminal may also comprise a SIM card 1304 and an associated reader. As is well known, the SIM card 1304 comprises a processor, and a local work and data memory.

It should be noted that the embodiments of the present invention may be implemented through hardware, software or a combination of software and hardware. The hardware portion may be implemented using a dedicated logic; the software portion may be stored in a memory and executed by an appropriate instruction executing system, e.g., a microprocessor or a dedicatedly designed hardware. A person of normal skill in the art may understand that the above device and method may be implemented using a computer-executable instruction and/or included in processor control codes. During implementation, such code is provided on a carrier medium such as a magnetic disk, a CD or a DVD-ROM, a programmable memory such as a read-only memory (firmware) or a data carrier such as an optical or electronic signal carrier.

In one example, there is provided a non-transient computer-readable medium including a computer program product, the computer program product including a machine-executable instruction that, when being executed, causes a machine to perform: for each predetermined numerical value of one or more predetermined numerical values, comparing the video frame with a video frame spaced prior to the video frame by the predetermined numerical value of frames to obtain a first inter-frame difference; comparing the video frame with a video frame spaced after the video frame by the predetermined numerical value of frames to obtain a second inter-frame difference; and for each pixel of the video frame, obtaining a confidence map associating the video frame by the predetermined numerical value based on a smaller value of the first inter-frame difference and the second inter-frame difference; and determining, at least based on a value of each pixel in one or more of the confidence maps associated with a corresponding predetermined numerical value, whether the pixel belongs to a foreground.

In another example, there is provided an apparatus, comprising: at least one processor; and at least one memory including computer program code; the at least one memory and the computer program code being configured to cause, with the at least one processor, the apparatus to at least perform: for each predetermined numerical value of one or more predetermined numerical values, comparing the video frame with a video frame spaced prior to the video frame by the predetermined numerical value of frames to obtain a first inter-frame difference; comparing the video frame with a video frame spaced after the video frame by the predetermined numerical value of frames to obtain a second inter-frame difference; and for each pixel of the video frame, obtaining a confidence map associating the video frame by the predetermined numerical value based on a smaller value of the first inter-frame difference and the second inter-frame difference; and determining, at least based on a value of each pixel in one or more of the confidence maps associated with a corresponding predetermined numerical value, whether the pixel belongs to a foreground.

The device and its modules in the present invention may be implemented by hardware circuits such as a very-large scale integrated circuit or gate array, a semiconductor such as a logic chip, a transistor, etc., or a programmable hardware device such as a field programmable gate array, a programmable logic device, etc., may also be implemented by software executed by various types of processors, and may also be implemented by a combination of the above hardware circuits and software, e.g., firmware.

It should be noted that although several modules or sub-modules of the apparatus have been described above in detail, such division is only not compulsory. In fact, according to the embodiments of the present invention, features and functions of two or more modules described above may be instantiated in one module. In turn, features and functions of one module as described above may be further divided into multiple modules to instantiate.

In addition, although operations of the method according to the present invention have been described in a particular sequence in the drawings, it does not require or imply that these operations must be executed according to the particular sequence or a desired result can only be achieved after all of the illustrated operations have been completely executed. On the contrary, the steps depicted in the flow diagram may alter their execution sequences. Additionally or alternatively, some steps may be omitted, a plurality of steps may be merged into one step for execution, and/or one step may be decomposed into a plurality of steps for execution.

Although the present invention has been described above with reference to a plurality of preferred embodiments, it should be understood that the present invention is not limited to the preferred embodiments as disclosed. The present invention intends to cover various modifications and equivalent arrangements included within the spirit and scope of the appended claims. The scope of the appended claims meets broadest explanations so as to include all such modifications and equivalent structures and functions.

The invention claimed is:

1. A method for processing a video frame in a video sequence, comprising:
    for each predetermined numerical value of one or more predetermined numerical values,
        comparing, by a processor, the video frame with a video frame spaced prior to the video frame by the predetermined numerical value of frames to obtain a first inter-frame difference;

comparing, by the processor, the video frame with a video frame spaced after the video frame by the predetermined numerical value of frames to obtain a second inter-frame difference; and for each pixel of the video frame, obtaining, by the processor, a confidence map associating the video frame by the predetermined numerical value based on a smaller value of the first inter-frame difference and the second inter-frame difference; and determining, by the processor, at least based on a value of each pixel in one or more of the confidence maps associated with a corresponding predetermined numerical value, whether the pixel belongs to a foreground.

2. The method of claim 1, wherein the determining whether the pixel belongs to a foreground is also based on a value of the each pixel in a confidence map associated with a background, and the confidence map associated with the background is obtained through the following steps:

selecting a plurality of consecutive video frames that include the video frame in the video sequence;

building a background of the video sequence based on the plurality of consecutive video frames; and comparing the video frame with the background to obtain a confidence map associated with the background.

3. The method of claim 2, wherein the plurality of consecutive video frames further include a video frame spaced prior to the video frame with a maximum predetermined numerical value of the one or more predetermined numerical values of frames, and a video frame spaced after the video frame with the maximum numerical value of frames.

4. The method of claim 1, wherein the determining, at least based on a value of each pixel in one or more of the confidence maps associated with a corresponding predetermined numerical value, whether the pixel belongs to a foreground comprises:

when respective values of the pixel in respective confidence maps are all greater than a first threshold, determining that the pixel belongs to the foreground; and when respective values of the pixel in respective confidence maps are all smaller than a second threshold, determining that the pixel belongs to the background.

5. The method of claim 4, wherein the determining, at least based on a value of each pixel in one or more of the confidence maps associated with a corresponding predetermined numerical value, whether the pixel belongs to the foreground comprises:

when respective values of the pixel in respective confidence maps are not all greater than the first threshold or not all smaller than the second threshold, where an adjacent domain of the pixel only has pixels determined to be the foreground, taking the maximum value in the respective values as a probabilistic value for the pixel belonging to the foreground;

where an adjacent domain of the pixel only has a pixel determined to be the background, taking a minimum value in the respective values as a probabilistic value for the pixel belonging to the foreground;

otherwise, taking a mean value of the respective values as a probabilistic value for the pixel belonging to the foreground;

when the probabilistic value for the pixel belonging to the foreground is greater than a third threshold, determining that the pixel belongs to the foreground and when the probabilistic value for the pixel belonging to the foreground is less than a third threshold, determining that the pixel belonging to the background.

6. The method of claim 2, wherein the building a background of the video sequence based on the plurality of consecutive video frames comprises:

determining a relative motion vector of each video frame in the plurality of consecutive video frames relative to a preceding video frame;

aligning the plurality of video frames spatially based on the relative motion vector to determine corresponding pixel points of a same spatial point on each video frame of the plurality of video frames;

clustering all pixel points corresponding to the each spatial point, to obtain pixel points associated with the background corresponding to the each spatial point; and building the background of the video sequence based on the obtained pixel points associated with the background corresponding to the each spatial point.

7. The method of claim 1, wherein the comparing the video frame with video frames spaced prior to/ after it by the predetermined numerical value of frames so as to obtain the first/second inter-frame difference comprises:

taking an absolute value of the difference regarding each pixel between the video frame and the video frames spaced prior to/ after it by the predetermined numerical value of frames with respect to a same attribute value as the first/ second inter-frame difference.

8. The method of claim 7, wherein the obtaining a confidence map associating the video frame by the predetermined numerical value based on a smaller value of the first inter-frame difference and the second inter-frame difference further comprises:

normalizing each smaller value to form a confidence map associated with the predetermined numerical value.

9. The method of claim 2, wherein comparing the video frame and the background to obtain a confidence map associated with the background further comprises:

normalizing absolute values of differences between the video frame and the background with respect to the same attribute value on each pixel so as to obtain a confidence map associated with the background.

10. An apparatus for processing a video frame in a video sequence, comprising:

at least one processor and at least one memory including a computer program code, wherein the at least one memory including the computer program code are configured, with the at least one processor, to cause the apparatus to:

for each predetermined numerical value of one or more predetermined numerical values, compare the video frame with a video frame spaced prior to the video frame by the predetermined numerical value of frames to obtain a first inter-frame difference;

compare the video frame with a video frame spaced after the video frame by the predetermined numerical value of frames to obtain a second inter-frame difference; and for each pixel of the video frame, obtain a confidence map associating the video frame by the predetermined numerical value based on a smaller value of the first inter-frame difference and the second inter-frame difference; and determine, at least based on a value of each pixel in one or more of the confidence maps associated with a corresponding predetermined numerical value, whether the pixel belongs to a foreground.

11. The apparatus of claim 10, wherein the apparatus is further caused to determine whether the pixel belongs to the foreground based on a value of the each pixel in a confidence map associated with a background, and the apparatus for processing a video frame in a video sequence is further caused to:
  select a plurality of consecutive video frames that include the video frame in the video sequence;
  build a background of the video sequence based on the plurality of consecutive video frames; and
  compare the video frame with the background to obtain a confidence map associated with the background.

12. The apparatus of claim 11, wherein the plurality of consecutive video frames further include a video frame spaced prior to the video frame with a maximum predetermined numerical value of the one or more predetermined numerical values of frames, and a video frame spaced after the video frame with the maximum numerical value of frames.

13. The apparatus of claim 10, wherein the apparatus is further caused to:
  when respective values of the pixel in respective confidence maps are all greater than a first threshold, determine that the pixel belongs to the foreground; and
  when respective values of the pixel in respective confidence maps are all smaller than a second threshold, determine that the pixel belongs to the background.

14. The apparatus of claim 13, wherein the apparatus is further caused to:
  when respective values of the pixel in respective confidence maps are not all greater than the first threshold or not all smaller than the second threshold,
    where an adjacent domain of the pixel only has pixels determined to be the foreground, take the maximum value in the respective values as a probabilistic value for the pixel belonging to the foreground;
    where an adjacent domain of the pixel only has a pixel determined to be the background, take a minimum value in the respective values as a probabilistic value for the pixel belonging to the foreground;
  otherwise, take a mean value of the respective values as a probabilistic value for the pixel belonging to the foreground; and
when the probabilistic value for the pixel belonging to the foreground is greater than a third threshold, determine that the pixel belongs to the foreground and
when the probabilistic value for the pixel belonging to the foreground is less than a third threshold, determine that the pixel belonging to the background.

15. The apparatus of claim 11, wherein the apparatus is further caused to:
  determine a relative motion vector of each video frame in the plurality of consecutive video frames relative to a preceding video frame;
  align the plurality of video frames spatially based on the relative motion vector to determine corresponding pixel points of a same spatial point on each video frame of the plurality of video frames;
  cluster all pixel points corresponding to the each spatial point, to obtain pixel points associated with the background corresponding to the each spatial point; and
  build the background of the video sequence based on the obtained pixel points associated with the background corresponding to the each spatial point.

16. The apparatus of claim 12, wherein comparing the video frame with video frames spaced prior to/ after it by the predetermined numerical value of frames so as to obtain the first/second inter-frame difference comprises:
  take an absolute value of the difference regarding each pixel between the video frame and the video frames spaced prior to/ after it by the predetermined numerical value of frames with respect to a same attribute value as the first/ second inter-frame difference.

17. The apparatus of claim 16, wherein the attribute value includes a grayscale value.

18. The apparatus of claim 16, wherein the obtaining a confidence map associating the video frame by the predetermined numerical value based on a smaller value of the first inter-frame difference and the second inter-frame difference further comprises:
  normalize each smaller value to form a confidence map associated with the predetermined numerical value.

19. The apparatus of claim 11, wherein the apparatus is further caused to:
  normalize absolute values of differences between the video frame and the background with respect to the same attribute value on each pixel so as to obtain a confidence map associated with the background.

20. The apparatus of claim 14, wherein the third threshold is a value between the first threshold and the second threshold.

* * * * *